United States Patent
Cai et al.

(10) Patent No.: US 9,648,559 B2
(45) Date of Patent: May 9, 2017

(54) SYSTEMS AND METHODS FOR DIFFERENTIATED FAST INITIAL LINK SETUP

(71) Applicant: FutureWei Technologies, Inc., Plano, TX (US)

(72) Inventors: Lin Cai, Schaumburg, IL (US); George Calcev, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 73 days.

(21) Appl. No.: 13/948,452

(22) Filed: Jul. 23, 2013

(65) Prior Publication Data
US 2014/0254502 A1   Sep. 11, 2014

Related U.S. Application Data

(60) Provisional application No. 61/775,126, filed on Mar. 8, 2013.

(51) Int. Cl.
   H04W 4/00       (2009.01)
   H04W 48/20      (2009.01)
   H04W 76/02      (2009.01)

(52) U.S. Cl.
   CPC ............ *H04W 48/20* (2013.01); *H04W 76/02* (2013.01)

(58) Field of Classification Search
   None
   See application file for complete search history.

(56) References Cited

U.S. PATENT DOCUMENTS

2002/0065082 A1    5/2002  Yegani et al.
2007/0297438 A1*  12/2007  Meylan et al. ............... 370/445
(Continued)

FOREIGN PATENT DOCUMENTS

| CN | 1323502 A | 11/2001 |
| CN | 102355740 A | 2/2012 |
| WO | 2012169855 A2 | 12/2012 |

OTHER PUBLICATIONS

International Search Report and Written Opinion of the International Searching Authority received in Patent Cooperation Treaty Application No. PCT/CN2014/073071 mailed Jun. 5, 2014, 11 pages.

(Continued)

*Primary Examiner* — Otis L Thompson, Jr.
(74) *Attorney, Agent, or Firm* — Slater Matsil, LLP

(57) ABSTRACT

System and method embodiments are provided for differentiated fast initial link setup. The embodiments enable improved performance of initial link setup by stations in a wireless local area network during the association process and mitigate the negative effect of bursty association on existing associated users. In an embodiment, a method in a wirelessly enabled network component for differentiated fast initial link setup in a wireless local area network, includes determining categories of station types for initial link setup; determining initial link setup conditions for each station type, wherein the initial link setup conditions specify a priority of associating for each station type; and broadcasting initial link setup conditions to a plurality of stations, wherein the stations determine whether to associate with the wirelessly enabled network component immediately or after a time duration according to the station types and initial link setup conditions.

26 Claims, 6 Drawing Sheets

(56) References Cited

U.S. PATENT DOCUMENTS

| | | | |
|---|---|---|---|
| 2010/0177756 A1* | 7/2010 | Choi et al. | 370/338 |
| 2013/0016648 A1 | 1/2013 | Koskela et al. | |
| 2013/0094484 A1* | 4/2013 | Kneckt et al. | 370/338 |
| 2013/0107703 A1* | 5/2013 | Cherian et al. | 370/230 |
| 2013/0109313 A1* | 5/2013 | Kneckt et al. | 455/41.2 |
| 2013/0229995 A1* | 9/2013 | Cai et al. | 370/329 |
| 2013/0230035 A1* | 9/2013 | Grandhi et al. | 370/338 |
| 2013/0235720 A1* | 9/2013 | Wang et al. | 370/229 |
| 2013/0235773 A1* | 9/2013 | Wang et al. | 370/311 |
| 2013/0294354 A1* | 11/2013 | Zhang et al. | 370/329 |
| 2013/0339438 A1* | 12/2013 | Cherian et al. | 709/204 |
| 2014/0064245 A1* | 3/2014 | Abraham et al. | 370/331 |
| 2014/0071873 A1* | 3/2014 | Wang et al. | 370/311 |
| 2014/0092779 A1 | 4/2014 | Seok et al. | |
| 2014/0105131 A1* | 4/2014 | Chu et al. | 370/329 |

OTHER PUBLICATIONS

Cai, L. et al., "System and Methods for Differentiated Association Service Provisioning in WiFi Networks," U.S. Appl. No. 13/781,380, filed Feb. 28, 2013, 17 pages.
Yunoki, K. et al., "Probe Request and Response in TGai," IEEE 11-11/1414r2, Nov. 2, 2011, 15 pages.
Barber, P. et al., "GAS Version Control in 11ai," IEEE 802.11-11/1498-01-00ai, Oct. 24, 2011, 16 pages.
Barber, P. et al., "GAS Query Optimization in 11ai," IEEE 802.11-11/1499-00-00ai, Oct. 24, 2011, 13 pages.
Fang, P. et al., "IEEE 802.11 Wireless LANs: Specification Framework for TGai," Nov. 14, 2012, 13 pages.
Liu, Y., "2007+ STA Support," EXTEND 20111024r0 Marvell 2007+ STA Support, Oct. 24, 2011, 7 pages.
"Differentiated Initial Link Setup (Follow Up)," IEEE 802.11-12/0786r1, XP068039264, Jul. 5, 2012, 19 pages.
"Normative Text for Differentiated Initial Link Setup," IEEE 802.11-13/xxxxr0, IEEE P802.11, Wireless LANs, XP068040411, Jan. 2013, 5 pages.
"Normative Text for Differentiated Initial Link Setup," IEEE 802.11-13/0033r1, IEEE P802.11, Wireless LANs, KP068040412, Jan. 16, 2013, 6 pages.

\* cited by examiner

SYSTEMS AND METHODS FOR DIFFERENTIATED FAST INITIAL LINK SETUP

CROSS-REFERENCE TO RELATED APPLICATIONS

The present application claims the benefit of U.S. Provisional Patent Application No. 61/775,126 filed Mar. 8, 2013 and entitled "System and Method for Differentiated Fast Initial Link Setup," which is incorporated herein by reference as if reproduced in its entirety.

TECHNICAL FIELD

The present invention relates to a system and method for wireless communications, and, in particular embodiments, to a system and method providing differentiated fast initial link setup.

BACKGROUND

FIG. 1 illustrates a system 100 for Generic Advertisement Service (GAS) and Access Network Query Protocol (ANQP) operation. The system includes stations (STAs) 102, an access point (AP) 104, a service provider network 106, roaming hubs 108, and home location registers (HLRs) 110. The various components may be arranged as shown in FIG. 1. First, a user 102 chooses to connect to Wi-Fi, and the user's device scans for available hotspots. IEEE 802.11u GAS is used to provide for Layer 2 transport of an advertisement protocol's frames between a terminal and a server in the network prior to authentication. Institute of Electrical and Electronics Engineers (IEEE) 802.11u ANQP is used to discover different features and available services of the network. The device then proceeds with the authentication process.

A STA 102 may be any of the devices illustrated in FIG. 1, such as a cell phone, laptop, tablet, smart sensor, handheld or consumer electronic device, and other user devices that have a WiFi interface that can interact with a WiFi network. These devices also may be able to interact with other types of communication networks, such as a cellular network. An AP 104 and one or more STAs 102 can form a basic service set (BSS), which is the basic building block of an IEEE 802.11 wireless local area network (WLAN). An AP 104 may communicate with an AP controller or an ANQP server, which can be collocated or not with the AP 104. A BSS generally can be identified by a service set identifier (SSID), which is configured and may be broadcasted by the AP 104.

It is expected that WiFi systems will support a large number of stations (STAs) with improved network capacity, thanks to advances in communication technologies. In other words, access points (APs) should be capable to handle a large number of communication requests simultaneously when mobile devices enter and leave the WiFi domains. For example, in a train station when the train stops, many WiFi users that are video streaming or browsing the Internet may come out the train at the same time and try to associate with the AP in the station and continue their video or Internet browsing. In the power outage area, smart meters need to transmit a "last gasp" notification message that alerts the distributor to their loss of power. Moreover, after a long power outage, multiple devices such as smart meters may try to re-associate with the AP. In such cases, a large number of STAs with different types of messages may communicate with the AP in a burst manner. However, due to the contention nature of carrier sense multiple access with collision avoidance (CSMA/CA), simultaneous communications will cause collisions and thus result in a long channel access delay. An overly long access delay may not only cause more energy consumption of mobile devices, but also jeopardize the quality of service (QoS) provisioning of multimedia services. Hence, QoS-aware network association in a WiFi system in support of multiple types of STAs should be considered.

SUMMARY OF THE INVENTION

In accordance with an embodiment, a method in a wirelessly enabled network component for differentiated fast initial link setup in a wireless local area network, includes determining categories of station types for initial link setup; determining initial link setup conditions for each station type, wherein the initial link setup conditions specify a priority of associating for each station type; and broadcasting initial link setup conditions to a plurality of stations, wherein the stations determine whether to associate with the wirelessly enabled network component immediately or after a time duration according to the station types and initial link setup conditions.

In accordance with another embodiment, a network component configured for differentiated fast initial link setup in a wireless local area network comprising: a processor and a computer readable storage medium storing programming for execution by the processor, the programming including instructions to: determine categories of station types for initial link setup; determine initial link setup conditions for each station type, wherein the initial link setup conditions specify a priority of associating for each station type; and broadcast initial link setup conditions to a plurality of stations, wherein the stations determine whether to associate with the wirelessly enabled network component immediately or after a time duration according to the station types and initial link setup conditions.

In accordance with another embodiment, a method in a wireless communication device for associating with a wireless access point (AP) includes receiving initial link setup (ILS) conditions from the AP, wherein the ILS conditions identify a plurality of different station types and when the different station types are authorized to attempt to associate with the AP; determining a station type of the wireless communication device; and beginning associating with the AP at a time specified in the ILS conditions for the station type of the wireless communication device.

In accordance with another embodiment, a network component configured for differentiated fast initial link setup in a wireless local area network includes a processor and a computer readable storage medium storing programming for execution by the processor, the programming including instructions to: receive initial link setup (ILS) conditions from the AP, wherein the ILS conditions identify a plurality of different station types and when the different station types are authorized to attempt to associate with the AP; determine a station type of the wireless communication device; and begin associating with the AP at a time specified in the ILS conditions for the station type of the wireless communication device.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
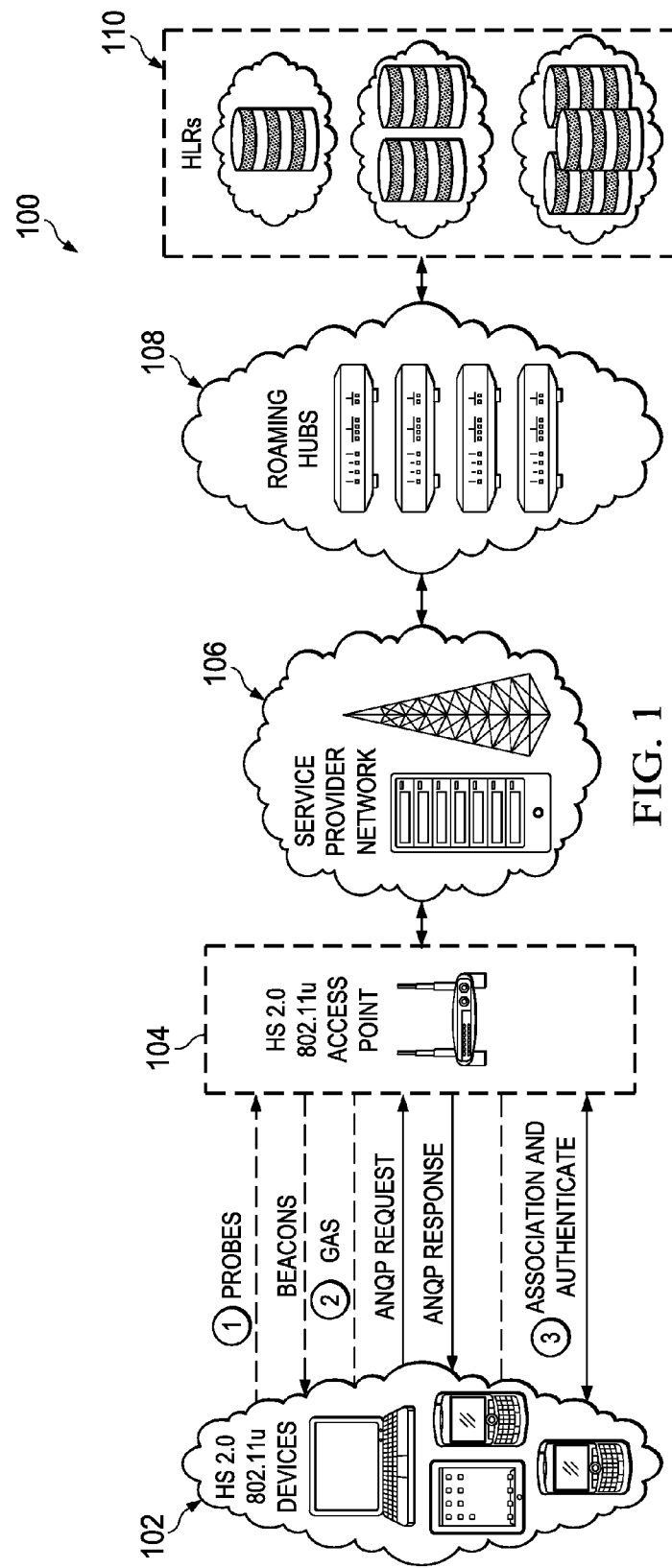
FIG. 1 illustrates a system for Generic Advertisement Service (GAS) and Access Network Query Protocol (ANQP) operation.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

It is expected that WiFi systems will support a large number of STAs with improved network capacity, due to advanced communication technologies. In other words, access points (APs) should be capable to handle a large number of communication requests simultaneously when mobile devices enter and leave the WiFi domains. For example, in a train station when the train stops many WiFi users that are video streaming or browsing the internet will come out the train at the same time and try to associate with the AP in the station and continue their video or Internet browsing. As another example, in the power outage area, smart meters need to transmit a last gasp notification message that alerts the distributor to their loss of power. Moreover, after a long power outage, multiple devices such as smart meters will try to re-associate with the AP. In such cases, a large number of STAs with different types of messages will communicate with the AP in a bursty manner.

However, due to the contention nature of CSMA/CA, simultaneous communications will causes collisions and thus result in a long channel access delay. An overly long access delay may not only cause more energy consumption of mobile devices, but also jeopardize the quality of service (QoS) provisioning of multimedia services. Therefore, QoS-aware network association in a WiFi system in support of multiple types of STAs is beneficial.

Several approaches have been proposed in IEEE 802.11 TGai to improve the network discovery and network association via Generic Advertisement Service (GAS) and Access Network Query Protocol (ANQP) design. Huawei proposed GAS control and GAS query optimization to facilitate network association in by allowing STAs to retrieve information of multiple APs. KDDI lab proposed to reduce the unnecessary probe request and response messages to avoid severe collisions and resultant overly delays in the network association phase. The main objective of these proposals is to reduce the association delay and facilitate fast link setup, without considering QoS requirements of different traffic flows. In a realistic network scenario, when a large number of devices attempt network association in a burst manner, not all flows can successfully associate with the AP during a certain time interval due to the limited capacity of the network. In this case, it is important to ensure high priority devices to associate first.

In one embodiment, a method for providing differentiated association in a WiFi network includes assigning different association priority types (or priority categories) to a plurality of stations (STAs) that share a channel of the WiFi network, wherein the STAs with higher association priority classes wait for shorter times before starting association with an AP over a shared channel. The AP broadcasts initial link setup conditions to the STAs. In an embodiment, the initial link setup conditions include a differentiated initial link setup element. The initial link setup conditions provide the STAs with information that allow the STAs to categorize themselves according to the types specified by the AP and to begin associating with the AP at a time specified by the initial link setup conditions. Some STAs may be instructed to being associating immediately, while other categories or types of STAs may be instructed to wait until the expiration of a specified time before beginning to associate with the AP.

In another embodiment, a method for providing differentiated association in a WiFi network includes determining, at a STA, an association priority class for the STA, entering a sleep mode for a duration time corresponding to the determined association priority class, and starting an association procedure between the STA and an access point (AP) of the WiFi network after the duration time ends.

In another embodiment, an AP component configured to support differentiated association in a WiFi network includes a processor and a computer readable storage medium storing programming for execution by the processor. The programming includes instructions to assign different association priority classes to a plurality of STAs that share a channel of the WiFi network, wherein STAs of higher association priority classes wait for a shorter time before attempting association with an AP over a shared channel.

In yet another embodiment, a STA configured to support differentiated association in a WiFi system includes a processor and a computer readable storage medium storing programming for execution by the processor. The programming includes instructions to enter a sleep mode for a duration time corresponding to an association priority class assigned to the STA, and start an association procedure between the STA and an AP of the WiFi network after the duration time ends.

In an embodiment, the STAs can be classified into different association categories based on the traffic type or traffic Quality of Service (QoS) requirements, subscriber type, or random generator. The STAs may also be classified based on priorities, such as the priority of different types of transmissions (e.g., video, audio, data, etc.). In an embodiment, high priority category STAs are associated with the AP sooner while other categories or types of STAs postpone their association by different time durations. As used herein the phrases categories of STAs, types of STAs, STA categories, and STA types are used interchangeably.

In an embodiment, WiFi and other wireless LANs have improved performance of initial link setup by differentiating STAs during the association process. Additionally, disclosed embodiments mitigate the negative effect of bursty association on existing associated users.

In an IEEE 802.11 WLAN, a communication channel with an AP can be shared by multiple STAs coordinated by a distributed channel access function, referred to as a distributed coordination function (DCF). The DCF is based on a carrier sense multiple access with collision avoidance (CSMA/CA) mechanism. The DCF uses both physical and virtual carrier sense functions to determine the state of the channel. The physical carrier sense resides in the physical layer (PHY) and uses energy detection and preamble detection to determine whether the channel is busy. The virtual carrier sense resides in the media access control layer (MAC) and uses reservation information, e.g., in a Duration field of a MAC header, which indicates the impeding use of the wireless channel. The wireless channel generally is determined to be idle (not busy) when both the physical and virtual carrier sense mechanisms indicate it to be so.

An embodiment system and method provide differentiated association service in a WiFi system by prioritizing or classifying STAs for differentiated initial link setup. In an embodiment, stations are classified into different categories (or station types), namely, association categories (ASCs), which is a label used by associating station (STA) to associate with an access point (AP) with certain priorities. APs send out differentiated initial link setup information elements in some management and control frames to notify STAs for differentiated association service. An AP includes the differentiated initial link setup information in beacon frames, probe response frames, and FILS discovery (FD) frames to inform non-AP STAs which ASCs (one or more ASC categories) can associate with the AP in the following time duration. STAs are differentiated in the pre-association stage, so that STAs can associate with the AP in a prioritized way for efficient association. Detailed frame and information element design for implementing differentiated FILS is described below.

Figure 2:
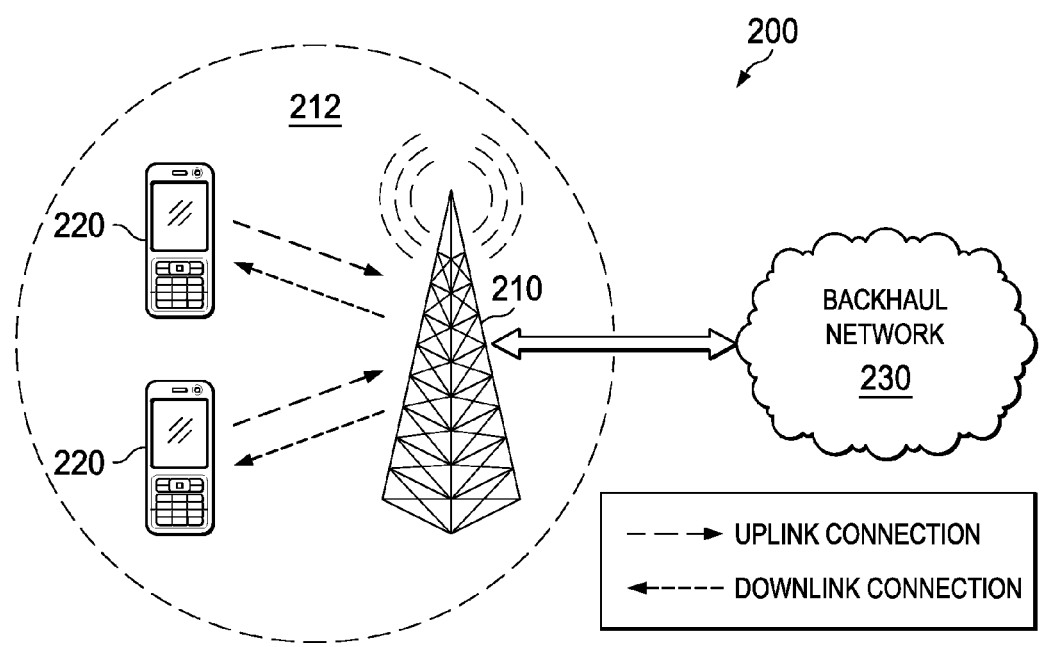
FIG. 2 illustrates a network for communicating data.

FIG. 2 illustrates a network 200 for communicating data. The network 200 includes an access point (AP) 210 having a coverage area 212, a plurality of user equipment (UEs) 220, and a backhaul network 230. As used herein, the term AP may also be referred to as a transmission point (TP), a BTS, or an enhanced base station (eNB), and the different terms may be used interchangeably throughout this disclosure. The AP 210 may comprise any component capable of providing wireless access by, inter alia, establishing uplink (dashed line) and/or downlink (dotted line) connections with the UEs 220, such as a BTS, an eNB, a femtocell, and other wirelessly enabled devices. The UEs 220 may comprise any component capable of establishing a wireless connection with the AP 210. The backhaul network 230 may be any component or collection of components that allow data to be exchanged between the AP 210 and a remote end (not shown in FIG. 2). In some embodiments, the network 200 may comprise various other wireless devices, such as relays, femtocells, etc.

Figure 3:
FIG. 3 shows a distributed channel access (DCA) scheme for a WiFi or IEEE 802.11 WLAN system.

FIG. 3 shows a distributed channel access (DCA) scheme 300 for a WiFi or IEEE 802.11 WLAN system. The scheme 300 involves a plurality of STAs (e.g., STA1, STA2, STA3, and STA4) that share a channel to transmit their data frames, e.g., to an AP. A STA with a data frame for transmission first performs a clear channel assessment (CCA) by sensing the wireless channel for a fixed duration, referred to as a DCF inter-frame space (DIFS). If the wireless channel is busy with a data frame transmission of another STA, then the sensing STA waits until the channel remains idle for a DIFS period of time. For example, after transmitting a data frame 310, STA1 waits for a DIFS period of time during which the channel remains idle before attempting to transmit a second data frame over the channel.

After waiting for a DIFS, the STA waits further for a "backoff" period before attempting to transmit another frame if the channel is sensed busy during DIFS. This can be implemented by a backoff timer that decreases by one time unit at a time after detecting the channel to be idle (free of data frame transmission), until the backoff timer reaches zero. During the backoff time, the timer is paused whenever the channel is sensed busy. For example, STA1 starts the backoff timer when the channel becomes idle for a DIFS. In other words, STA1 defers starting the backoff time until the end of the transmission of frame 320 from STA2. After starting the backoff time, STA1 pauses the timer during the backoff time when a new data frame 330 is transmitted by STA4 on the channel. When the channel becomes idle again for a DIFS time duration, the STA restarts the timer to continue decreasing the remaining backoff time. For example, STA1 continues decreasing the backoff time after the data frame 330 is transmitted, but pauses the timer again when another data frame 340 from STA2 is detected on the channel, and resumes the timer after a DIFS duration from completing data frame 340 transmission. When the backoff timer reaches zero, the STA starts transmitting its data frame if the channel is idle. For example, SAT1 transmits another data frame 350 after the remaining backoff time reaches zero and no other data frame is detected on the channel.

Figure 4:
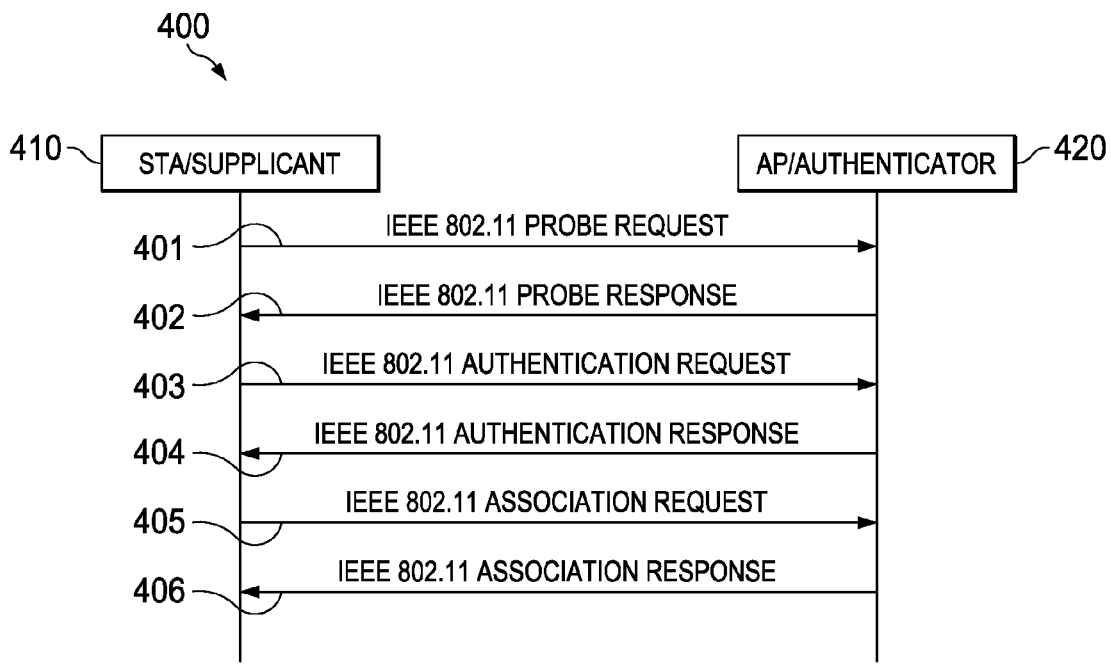
FIG. 4 illustrates a network link association and authentication procedure according to IEEE 802.11.

FIG. 4 illustrates a network link association and authentication procedure 400 according to IEEE 802.11. The procedure is established between a STA 410 and an AP 420, for example between a mobile device and a WiFi modem. The STA 410 first sends a probe request 401, which can be intercepted by the AP 420. Upon receiving a probe response 402 from the AP 420, the STA 410 transmits an authentication request 403 to the AP 420. The AP 420 then authenticates the STA 410 or forwards the request to an authentication server (not shown), and sends back an authentication response 404 to the STA 410. After authentication is completed, the STA 410 can initiate network association by a handshaking process with the AP 420, via association request 405 and response 406 message exchanges. In some scenarios, the association procedure 400 can skip the probe request 401/response 402 exchange if the necessary information is broadcasted in a beacon from the PA 420 and received/decoded by the STA 410.

In real network scenarios, when a large number of devices attempt network association in a burst manner (e.g., at about the same time), it is possible that not all flows can successfully associate with the AP during a certain time interval due to the limited capacity of the network, especially when there are contentions on a shared channel. In such cases, it is important to ensure that higher priority devices can associate first with the AP. A system and methods are provided herein for achieving QoS-aware network association, e.g., to provision differentiated services for STAs carrying different types of applications in a WiFi system. The term association is used to indicate the initiation and authentication of STAs with an AP to access a WiFi network and begin WiFi communications, such as in the procedure 400. The term association used herein also includes similar actions, such as re-association of STAs with an AP or handover of STAs between APs or networks. The embodiment methods and schemes described below and applied to such association actions can also be similarly used for other suitable functions, such as emergency signaling.

An IEEE 802.11 network may comprise different types of STAs with different applications. For instance, some of the STAs may include sensor devices, e.g., temperature sensors, smoke sensors, and/or electrical meters, while other STAs may include offloading devices, such as smart phones, laptops, and/or computer tablets. The sensor devices may be designed for some applications with relatively high QoS requirements. For example, smart meters record the consumed electric energy and transmit the recorded data periodically. However, when the smart meters detect a power outage, the meters need to transmit a 'last gasp' message (to the AP or network) to notify the distributor as soon as possible. Offloading devices can use different applications with different QoS requirements. For example, a phone call that undergoes a handover from a cellular network to a WiFi network requires a minimal (pre-defined) handover delay to ensure call quality, while a file transfer or software update can tolerate relatively long delays. Due to the contention nature of the IEEE 802.11 system (e.g., on the shared channel), when a large number of STAs need to associate with the AP and not all requests can be satisfied in a relatively short time interval, providing differentiated quality of service association is needed to guarantee faster association for STAs with critical applications (e.g., with higher priority QoS requirements).

In an embodiment, a system and methods are implemented to provide QoS based association via allocation of association priority class to each WiFi device. The embodiment system includes categorizing the STAs into a number N of classes of association priorities. For instance, 4 classes may be considered, including a first class that represents devices that require fast association, such as a phone in a handover procedure (between APs or between a cellular network and a WiFi network) or a sensor device carrying critical messages, e.g. a 'last gasp' notification or a gas leakage alarm. The classes may include a second class that represents devices which have real time interactive traffic, such as for electronic payment. A third class may represent devices that can tolerate a relatively longer association delay, such as smart phones sending/receiving emails or sensor devices communicating regular (non-urgent) data reports. A fourth class may represent other devices with best effort traffic that do not have delay requirement. The priority class can be determined by the applications running or carried on the devices. If a device carries multiple types of applications, then the priority can be determined by the highest priority of these applications. In addition, when an application changes, e.g., when a voice call of a device terminates, the priority of the device is updated accordingly, based on the device's current applications. Alternatively, the STAs are categorized into different classes based on the STA types or subscribers' priorities, or a random number generator. Different STA types or subscribers' priorities have different association priorities. The STAs can also be categorized into different classes based on any combination of the above factors with different weights. For example, the applications can be given higher weight that then the STA types or subscribers' priorities.

Different embodiment methods may be used to categorize the STAs. For instance, an AP of the system can configure the association priority of a STA. Alternatively, a STA of the system can select an association priority based on its application, device type, subscriber's priority, or a random number generated by device, as described above. For example, a higher priority subscriber can have a higher priority for association.

In an embodiment method, a minimum wait duration, denoted as $t\_n$, is assigned for each STA of class n, where n is an integer that indicates a class of association priority, for example n=0, 1, 2, or 3 for a total of 4 classes of association priorities. A STA of class n waits at least $t\_n$ before proceeding to or attempting to associate with an AP (e.g., if the shared channel is idle). For 4 classes, for example, 4 minimum wait durations are assigned such that $t\_0 < t\_1 < t\_2 < t\_3$, where a first period $[t\_0, t\_1]$ is reserved for class 0. This means that only the first or highest association priority class can associate with an AP during this period. During a subsequent period $[t\_1, t\_2]$, both class 0 and class 1 (the next highest association priority class) can associate with the AP. Similarly, class 0, 1, and 2 can associate with the AP during the subsequent period $[t\_2, t\_3]$, and all STAs can associate after $t\_3$. The timer $t\_n$ may reside in the MAC layer of the STA and is not necessarily dependent on the accuracy of the physical time. To facilitate fast association, the wait duration $t\_0$ can be set to 0, so that class 0 STAs can proceed immediately to associate with the AP.

The wait durations $t\_1$, $t\_2$, and $t\_3$ can be pre-determined system parameters, can be determined by the AP, or can be configured by the operator or application. These parameters can be broadcasted or uni-casted by the AP to the STAs. When the parameters are determined by the AP, the AP can adjust the parameter $t\_n$ according to the estimated network situation or conditions, and broadcast the $t\_n$ for each class of association priority in the beacon frame or other information elements (IEs). A STA of association class n may go to sleep and wake up after the corresponding duration $t\_n$. The STA may then starts a network association procedure based on a CSMA/CA mechanism, such as the scheme 400. As described above, during the period $[t\_n-1, t\_n]$ for n>1, one or more classes may contend for association. In other embodiments, the STA can use an enhanced distributed channel access (EDCA) mechanism with different arbitrary inter-frame spaces (AIFSs) and contention windows (CWs) instead of CSMA/CA to further improve the differentiated association services.

In another embodiment method, a differentiated backoff window is used for achieving QoS-aware network association. Specifically, each class is associated with a backoff time window, denoted as $W\_n$. For example, 4 backoff time windows are assigned such that $W\_0 < W\_1 < W\_2 < W\_3$ for n=4 association classes. The parameters $W\_n$ can be pre-determined system parameters, or can be determined by the AP via some broadcast messages, such as beacons or any other IEs. A STA of class n can randomly select a time $t\_n$ from the window $W\_n$, e.g., $0 \le t\_n \le W\_n$, or $t\_n \in [0, W\_n]$. The STA then goes to sleep and wake up after $t\_n$. In this way, statistical priority can be achieved for different classes. In other words, a higher priority class has a greater probability to associate with the AP sooner than other classes. To further improve the probability and provide a stricter priority association, different random window assignment schemes can be used. For example, STAs of class n ($n \ge 1$) can also select $t\_n$ from $[W\_n-1, W\_n]$ for $n \ge 1$, and STAs of class 0 select $t\_0$ from $[0, W\_0]$ for n=0. In this way, a STA of a low priority class is less likely to transmit before a STA with a high priority class. After waking up, a STA can initiate a network association procedure based on CSMA/CA or EDCA.

In the WiFi system, a STA can be used to carry various types of traffic and the traffic itself can tolerate various delay (latency) values. Thus, the association priority, e.g., in the embodiment methods above, can be changed dynamically via requests from the application layer or at the MAC layer via inspection of the buffered types of traffic. For instance, if a MAC layer detects that voice traffic packets are buffered (for voice communications), then the MAC layer can upgrade an initial lower association priority (for normal traffic) to a higher priority accordingly. Similarly, if low priority traffic is detected, then the MAC layer can reduce the association priority accordingly.

In another embodiment, the association priority is changed dynamically based on information provided by an AP. To take into account the changing nature of traffic, the AP can override the STA association priority by sending a re-map between current STA priorities and new allocated priorities. The AP can notify one or more classes of STAs for association at different times. In a different embodiment, a pseudo-random change of priority is used, where a STA uses some random number generator to alter its association priority. For instance, a STA generates a random number to decide its association priority, or generates a random number and compares the number to a threshold (e.g., provided by the operator or AP) and then decides to increase or decrease the association priority if the random number generator is larger than the threshold.

In an embodiment system, the wireless network includes a plurality of APs operating in the same or different channels, where each AP accepts one or more different association priorities of other APs. For instance, a first AP accepts requests with association priority 0 and 1, while a second AP accepts request only for devices with association priority 2, 3, 4, etc. This approach can offer a better match between AP characteristics such as latency/throughput and the incoming association requests.

Figure 5:
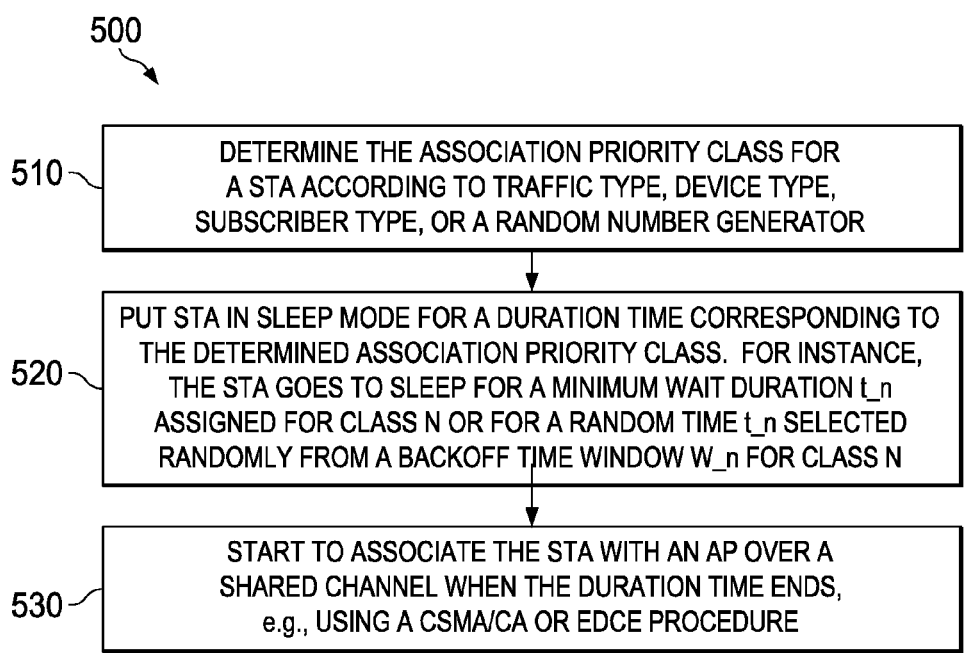
FIG. 5 shows an embodiment method to provide QoS based association via allocation of association priority class to each WiFi device.

FIG. 5 shows an embodiment method 500 to provide QoS based association via allocation of association priority class to each WiFi device. At step 510, the method 500 determines the association priority class for a STA according to traffic type, device type, subscriber type, or a random number generator, as described above. At step 520, the STA goes to sleep for a duration time corresponding to the determined association priority class. For instance, the STA is put in sleep mode for a minimum wait duration t_n assigned for class n or for a random time t_n selected randomly from a backoff time window W_n for class n. At step 530, start to associate the STA with an AP over a shared channel when the duration time ends, e.g., using a CSMA/CA or EDCE procedure.

Figure 6:
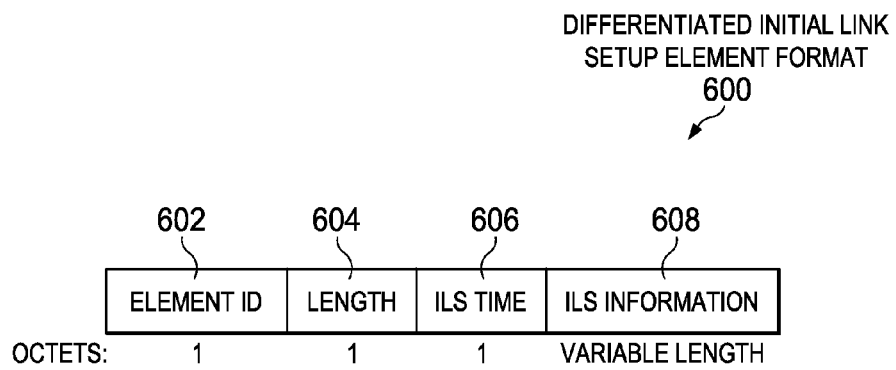
FIG. 6 shows an embodiment differentiated initial link setup (ILS) element format.

FIG. 6 shows an embodiment differentiated initial link setup (ILS) element 600 format. The differentiated ILS element 600 may be broadcast from an AP to nearby stations to specify when each station may initiate associating with the AP. Differentiated ILS element field 600 includes an element identifier (ID) field 602, a length field 604, an ILS time field 606, and an ILSC Information field 608. The element ID field 602 is used to identify the elements. All information elements start from an "element ID." The ILS time field 604 specifies the time that the non-priority STAs have to wait before they initiate their association in order to yield the priority access to higher priority STAs. In an embodiment, the element ID field 602, the length field 604, and the ILS time field 606 are each one octet in length. The ILSC Information field 608 may be a variable length and the length is specified by the length field 604. In an embodiment, the ILSC Information includes information that allows each station to determine its category, priority, and when (e.g., immediately or after the expiration of a specified time frame) it may initiate associating with the AP.

Figure 7:
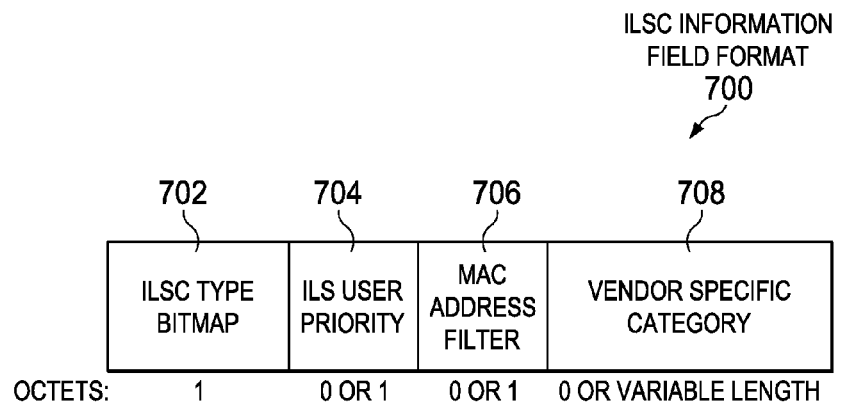
FIG. 7 shows an embodiment ILSC information field format.

FIG. 7 shows an embodiment ILSC information field 700 format. ILSC information field 700 may be implemented as ILSC information field 608 in FIG. 6. ILSC information field 700 includes an ILSC type bitmap subfield 702, an ILS user priority subfield 704, a MAC address filter subfield 706, and a vendor specific category subfield 708. ILSC type bitmap subfield 702 presents the bitmap of the available conditions that is applied to determine the ILSC STAs. The ILS user priority 704 subfield defines the traffic conditions that can be used to determine ILSC STAs. The MAC address filter subfield 706 presents the MAC address conditions to categorize ILSC STAs. The vendor specific category subfield 708 provides vendor specific conditions to categorize ILSC STAs. In an embodiment, the ILSC type bitmap subfield 702 is about one octet, the ILS user priority subfield 704 is about zero or one octet, the MAC address filter subfield 706 is about zero or one octets, and the vendor specific category subfield 708 is about zero octets or is of variable length.

Figure 8:
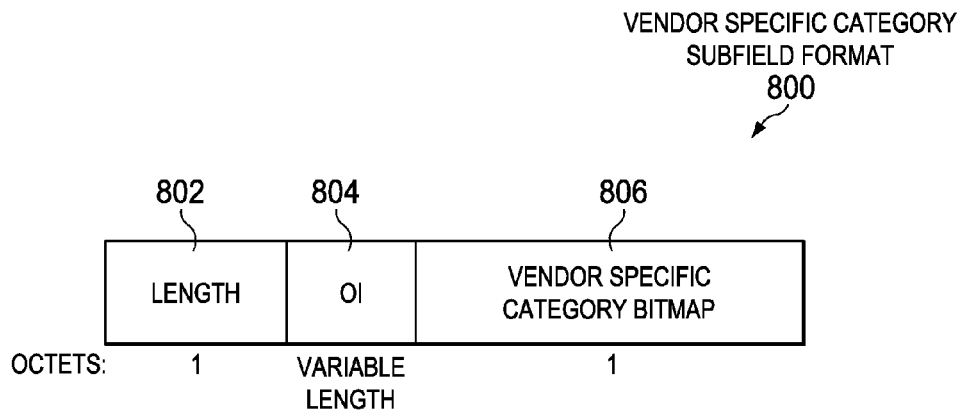
FIG. 8 shows an embodiment vendor specific category subfield format.

FIG. 8 shows an embodiment vendor specific category subfield 800 format. The vendor specific category subfield 800 may be implemented as vendor specific category subfield 706 in FIG. 7. The vendor specific category subfield 800 includes a length subfield 802, an OI subfield 804, and a vendor specific category bitmap field 806. The length field 800 indicate the length of the remaining fields; the OI subfield 804 specifies the Organizational Identifier (OI) which is a public organizationally unique identifier assigned by the IEEE; and the a vendor specific category bitmap field 806 includes some specific conditions for categorizing ILSC STAs specified by the vendor. In an embodiment, the length subfield 802 is about one octet, the OI subfield 804 is a variable length field, and the vendor specific category bitmap subfield is about one octet.

In an embodiment, a system and method are provided for differentiated association service in WiFi system by prioritizing or classifying STAs for differentiated initial link setup. Basically, stations are classified into different categories, namely, association category (ASC) which is a label used by associating STA to associate with an AP with certain priorities. The AP include the differentiated initial link setup information in beacon frames, probe response or fast initial link setup (FILS) discovery (FD) frames to inform non-AP STAs which ASCs (one or more ASC categories) can associate with the AP in the following time duration. To implement the differentiated FILS, the detail frame and information element design and protocol behavior are described below.

DEFINITIONS

Fast initial link setup category (FILSC): a label used by a STA attempting to associate with an AP with high priority.

Semantics of the Service Primitive:

Each BSSDescription consists of the elements shown in Table 1.

TABLE 1

| Name | Type | Valid range | Description | IBSS adoption |
|---|---|---|---|---|
| Differentiated initial link setup information | Differentiated initial link setup information element includes ILSC information field and ILS Time field | As defined in IEEE 802.11 section 8.4.2.187 | Differentiated initial link setup information includes ILSC information field and ILS Time field; This parameter is optional. | Do not adopt. |

Each BSSDescriptionFromFDSet consists of the following information items in Table 2:

TABLE 2

| Name | Type | Valid range | Description |
|---|---|---|---|
| Differentiated initial link setup information | Differentiated initial link setup information element includes ILSC information field and ILS Time field | As defined in IEEE 802.11 section 8.4.2.187 | Differentiated initial link setup information includes ILSC information field and ILS Time field; This parameter is optional. |

Beacon Frame Format:

TABLE 3

Beacon Frame Body

| ANA | Differentiated Initial Link Setup element | The Differentiated Initial Link Setup element, as specified in IEEE 802.11 section 8.4.2.187, is optionally present when dot11FILSActiveated is true. |
|---|---|---|

Probe Response Frame Format:

TABLE 4

Probe Response Frame Body

| ANA | Differentiated Initial Link Setup element | The Differentiated Initial Link Setup element, as specified in IEEE 802.11 section 8.4.2.187, is optionally present when dot11FILSActiveated is true. |
|---|---|---|

FILS Discovery Frame Format:

The FILS Discovery frame (FD) uses the Action Frame format. The format of its Action field is shown in Table 5.

TABLE 5

FILS Discovery Frame Field Format

| Order | Information | Notes |
|---|---|---|
| ANA | Differentiated Initial Link Setup element | The Differentiated Initial Link Setup element, as specified in IEEE 802.11 section 8.4.2.187, is optionally present when dot11FILSActiveated is true. |

General:

TABLE 6

Element IDs

| Element | Element ID | Length of indicated element (in octets) | Extensible |
|---|---|---|---|
| Differentiated Initial Link Setup Element | ANA | 4 | Yes |

Differentiated Initial Link Setup Element:

The Differentiated Initial Link Setup element notifies STAs of fast initial link setup category (FILSC) that are allowed to associate with the AP in the following time duration. The Differentiated Initial Link Setup element contains four fields and it is optionally present in the Beacon, Probe Response and FILS Discovery (FD) frames. The Differentiated Initial Link Setup element is defined in FIG. 4.

The Element ID field is equal to the Differentiated Initial Link Setup element value in Table 6 above.

The Length field is 1 octet long. It specifies the length of Differentiated Initial Link Setup element in octets.

The ILSC Information field is of variable length. It indicates the fast initial link setup category (FILSC) STAs that are allowed to associate with the AP during the following time as indicated in the ILS Time field.

The ILSC Information field contains one ILSC Type bitmap subfield and three optional subfields including ILS User Priority, Vendor Specific Category, MAC Address Filter, specified in FIG. 7. Differentiated Initial Link Setup element is present if any of the three optional subfields is present.

The ILSC type bitmap subfield is 1 octet in length as defined in Table 7A or Table 7B. A bit value of 1 in the bitmap indicates that the corresponding ILSC subfield is present. When more than one bits are set to 1, a non-AP STA shall check all present ILSC subfields.

TABLE 7A

ILSC Type subfield format

| ILSC subfield bitmap | Description |
|---|---|
| Bit 0 | ILS User Priority |
| Bit 1 | Vendor Specific Category |
| Bit 2 | MAC Address Filter |
| Bit 3-7 | Reserved |

TABLE 7B

ILSC Type subfield format

| ILS User Priority | Vendor specific Category | AC Address Filter | Reserved |
|---|---|---|---|
| Bit: 1 | 1 | 1 | 5 |

The ILS User Priority subfield is defined in Table 8A, and the ILS user priorities are mapped from user priority (UP). UP 4-UP 7 correspond to audio and video traffic. UP 0-P 3 correspond to data traffic. In an embodiment, audio and video traffic devices have a higher priority than data traffic. ILS user priority 2 refers to a STA with no traffic.

TABLE 8A

ILS User Priority Subfields

| Bit | ILS User Priority | Description |
|---|---|---|
| Bit 0 | 0 | UP 4-UP 7 |
| Bit 1 | 1 | UP 0-UP 3 |
| Bit 2 | 2 | No Traffic |
| Bit 3-7 | NA | Reserved |

Another embodiment is shown in Table 8B, where the ILS user priorities are mapped from user priority (UP). ILS UP bit 0 is set to 1 only if the value of UP is between 4 and 7. ILS UP bit 1 is set to 1 only if the value of UP is between 0 and 3. ILS UP bit 2 is set to 1 only if the STA has no data traffic.

TABLE 8B

ILS User Priority Subfield Format

| ILS User Priority bit 0 | ILS User Priority bit 1 | ILS User Priority bit 2 | Reserved |
|---|---|---|---|
| Bit: 1 | 1 | 1 | 5 |

The Vendor Specific Category subfield is defined in FIG. 6, which includes 1 byte length subfield, variable length OI subfield, and 1 byte Vendor Specific Category Bitmap subfield.

The 1 byte Length subfield specifies the length of the OI and the Vendor Specific Category subfields in Octets.

The OI subfield is of variable length.

The Vendor Specific Category Bitmap subfield is defined in Table 9.

TABLE 9

Vendor Specific Category Bitmap

| Bit | Vendor Specific Category Description |
|---|---|
| Bit 0 | Category 0 |
| Bit 1 | Category 1 |
| Bit 2 | Category 2 |
| Bit 3-7 | Reserved |

The MAC Address Filter subfield is 1 octet in length as defined in Table 10. Bit 0 to Bit 3 indicate which bits of Bit 4 to Bit 7 are available for STA MAC address filtering.

TABLE 10

MAC Address Filter Subfield Format

| Bit 0 | Bit 1 | Bit 2 | Bit 3 | Bit 4 | Bit 5 | Bit 6 | Bit 7 |
|---|---|---|---|---|---|---|---|
| 0 | 0 | 0 | 1 | Reserved | | | Available for MAC address filtering |
| 0 | 0 | 1 | 1 | Reserved | | Available for MAC address filtering | |
| 0 | 1 | 1 | 1 | Reserved | Available for MAC address filtering | | |
| 1 | 1 | 1 | 1 | Available for MAC address filtering | | | |
| All other values are reserved | | | | | | | |

The ILS Time field is an unsigned integer that specifies the time, expressed in units of TUs, or in units of ms or 10 ms, etc., beginning with the transmission of the frame with Differentiated Initial Link Setup element and ending after the ILS Time elapses, during which only the ILSC STAs that are indicated in ILSC Information field may be allowed to attempt initial link setup with the AP; all categories of STAs can attempt initial link setup with the AP after this time expires. In an embodiment, a TU is 1024 microseconds (µs).

Differentiated Initial Link Setup:

The differentiated link setup procedure provides a method for an AP to allow non-AP STAs of ILSC to associate with the AP to alleviate congestion and traffic peaks that may occur when excess links are set up simultaneously.

AP Procedures for Differentiated Initial Link Setup:

An AP with dot11FILSActivated equal to true may limit the number of STAs that are allowed to attempt association concurrently through the setting of the ILS Time and ILSC Information field of the Differentiated Initial Link Setup element.

If an AP receives link setup requests from STAs that are not allowed access at that time, the AP should ignore these requests.

Non-AP STA Procedures for Differentiated Initial Link Setup:

When a non-AP STA with dot11FILSActivated equal to true receives a Beacon, Probe Response or FD frame including Differentiated Initial Link Setup element, the STA shall check the ILSC information subfield of the Differentiated Initial Link Setup element to check if it satisfies the condition specified in each and every optional subfield that is present.

The ILSC information filed may include at least one of the optional subfields, which include ILS User Priority, Vendor Specific Category, and MAC Address Filter. A STA is considered a FILSC STA that is allowed for fast link setup only when it satisfies the condition specified in each and every optional subfield that is present in the ILSC information filed. In other words, if the STA does not satisfy at least one optional subfield present in the ILSC information field, then the STA is not considered a FILSC STA. A logical AND operation of all the conditions in the present optional subfields can be used to determine whether the STA is an ILSC STA. The logical AND is not needed if only one optional subfield is present.

If the STA does not satisfy one or more optional subfields present in the ILSC information field, then the STA is not considered a FILSC STA and its FILSC value is set to 0. A STA with FILSC value set to 0 shall check the ILS Time field and postpone the link setup until the time specified in ILS Time field elapses.

If ILS User Priority subfield is present in the Differentiated Initial Link Setup element, the STA shall check the ILS User Priority subfields. A STA checks its UP values corresponding to the data traffic, and compare them with the corresponding ILS User Priority bit. If a STA carries one or more types of traffic mapped to different ILS UP bits the ILS User Priority condition is satisfied if any of the corresponding bit value is set to 1 in the ILS User Priority subfield.

If Vendor Specific Category subfield is present, a STA shall check the OI subfield first. If the STA can understand the OI subfield, the STA shall check the following Vendor Specific Category Bitmap. Otherwise, the STA shall skip and ignore the Vendor Specific Category subfield, and assume the condition specified in Vendor Specific Category is satisfied.

If MAC Address Filter subfield is present, a STA shall compare the corresponding LSBs of its MAC address with the available bits of Bit 4 to Bit 7 in MAC Address Filter subfield, with LSB comparing to Bit 7. If the STA's corresponding LSBs of its MAC address are same as the available bits in MAC Address Filter subfield, the STA is allowed to attempt link setup. Otherwise, the STA shall postpone the link setup by the specified ILS Time.

A STA with its FILSC value of 1 is allowed to attempt initial link setup with the AP immediately. A STA with its FILSC value of 0 shall set a link setup timer to the value specified in the ILS Time field of the Differentiated Initial Link Setup element. A STA with its FILSC value of 0 can attempt initial link setup when the timer elapses to 0. Each time a STA receives a Beacon, Probe Response, or a FD frame including Differentiated Initial Link Setup element, the STA shall check the ILSC information subfield and update its FILSC value; the STA should also update its link setup timer to the ILS Time value in the latest received Differentiated Initial Link Setup element if the STA's FILSC value is 0.

U.S. patent application Ser. No. 13/781,380 filed on Feb. 28, 2012 and entitled "System and Methods for Differentiated Association Service Provisioning in WiFi Networks" provides additional information about differentiated association service provisioning in WiFi Networks and is incorporated herein by reference in its entirety. Additional information about WiFi networks may be found in IEEE 802.11, which is incorporated herein by reference in its entirety.

Figure 9:
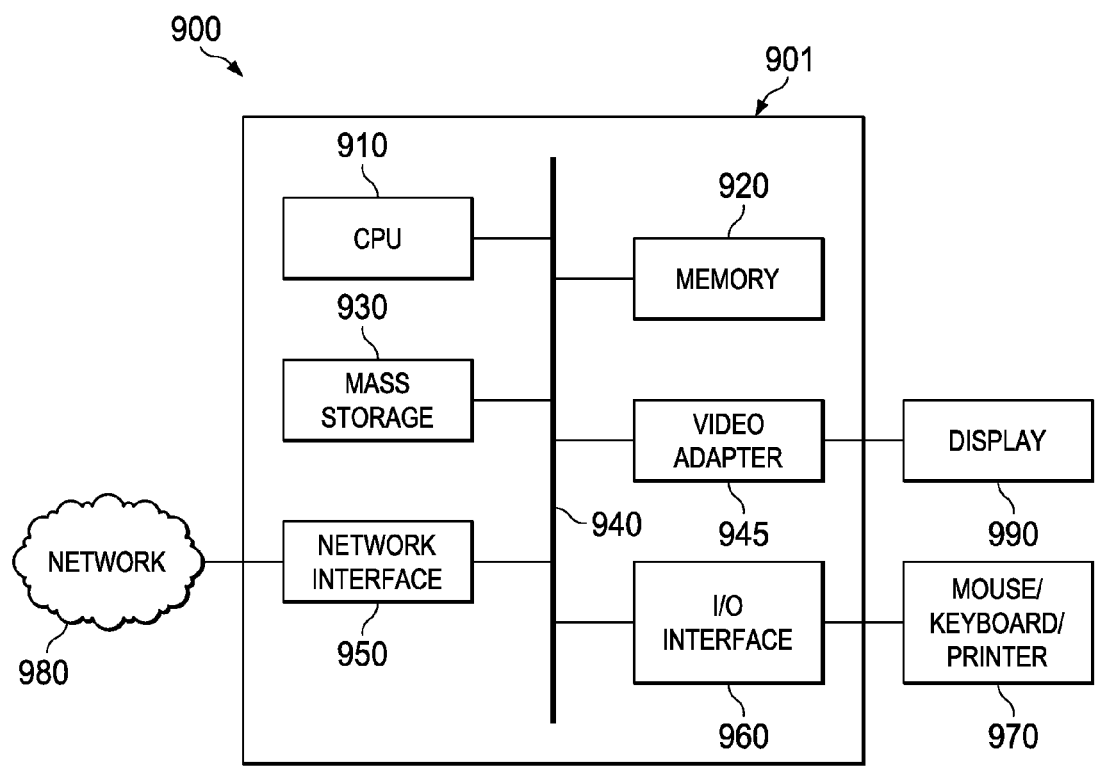
FIG. 9 is a processing system that can be used to implement various embodiments.

FIG. 9 is a block diagram of a processing system 900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, memory 920, a mass storage device 930, a network interface 950, a video adapter 945, and an I/O interface 960 connected to a bus 940.

The bus 940 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs.

The mass storage device 930 may comprise any type of storage device configured to store data, programs, and other information and to make the data, programs, and other information accessible via the bus 940. The mass storage device 930 may comprise, for example, one or more of a solid state drive, hard disk drive, a magnetic disk drive, an optical disk drive, or the like.

The video adapter 945 and the I/O interface 960 may provide interfaces to couple external input and output devices to the processing unit 901. As illustrated, examples of input and output devices may include a display 990 coupled to the video adapter 945 and a mouse/keyboard/printer 970 coupled to the I/O interface 960. Other devices may be coupled to the processing unit 901, and additional or fewer interface cards may be utilized. For example, a serial interface such as Universal Serial Bus (USB) (not shown) may be used to provide an interface for a printer.

The processing unit 901 may also include one or more network interfaces 950, which may comprise wired links, such as an Ethernet cable or the like, and/or wireless links to access nodes or different networks. The network interface 901 allows the processing unit to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a wirelessly enabled network component for differentiated fast initial link setup in a wireless local area network (WLAN), the method comprising:
   determining a plurality of initial link setup conditions for each station type according to a priority for each of a plurality of transmission types; and
   broadcasting the plurality of initial link setup conditions to a plurality of stations, wherein each of the stations determines when to associate with the wirelessly enabled network component according to the priority of the transmission types and plurality of initial link setup conditions, wherein a station that satisfies all of the plurality of initial link setup conditions is allowed to attempt to associate with the wirelessly enabled network component without additional delays, and wherein a station that does not satisfy all of the plurality of initial link setup conditions postpones attempting to associate with the wireless enabled network component until a time specified in a last received differentiated fast initial link setup (FILS) time field elapses.

2. The method of claim 1, wherein the station types comprise a first station type and a second station type, wherein stations that belong to the first station type are instructed to associate immediately and stations that belong to the second station type are instructed to postpone their association by a time duration specified in a differentiated initial link setup element.

3. The method of claim 1, wherein broadcasting the station types and plurality of initial link setup conditions comprises broadcasting a differentiated initial link setup element, wherein the differentiated initial link setup element comprises an element identifier field, a length field, and initial link setup category information field, and an initial link setup time field.

4. The method of claim 3, wherein the initial link setup category information field comprises an initial link setup category type bitmap field, an initial link setup user priority, and a media access control (MAC) address filter.

5. The method of claim 1, wherein the plurality of initial link setup conditions comprise a plurality of station type priorities and a plurality of association postponement times, wherein each of the plurality of association postponement times is associated with a corresponding one of the plurality of station type priorities.

6. The method of claim 1, wherein the plurality of initial link setup conditions limit a number of stations that may attempt to associate with the wirelessly enabled network component simultaneously.

7. The method of claim 1, wherein the plurality of initial link setup conditions specify that a station that is not authorized to attempt to associate with the wirelessly enabled network component immediately is to go into a sleep mode until an expiration of a specified time frame.

8. The method of claim 1, wherein the plurality of initial link setup conditions specify that a station that is not authorized to attempt to associate with the wirelessly enabled network component is put in sleep mode for a minimum wait duration assigned for a station type for which the at least one station belongs.

9. The method of claim 1, wherein the plurality of initial link setup conditions specify that a station that is not authorized to attempt to associate with the wirelessly enabled network component is put in sleep mode for a random time selected randomly from a backoff time window associated with a station type for which the at least one station belongs.

10. The method of claim 1, wherein higher priority stations are authorized to associate sooner than are lower priority stations.

11. A wirelessly enabled network component configured for differentiated fast initial link setup in a wireless local area network comprising:
a processor; and
a computer readable storage medium storing programming for execution by the processor, the programming including instructions to:
determine a plurality of initial link setup conditions for each station type according to a priority for each of a plurality of transmission types; and
broadcast the plurality of initial link setup conditions to a plurality of stations, wherein each of the stations determines when to associate with the wirelessly enabled network component according to the priority of the transmission types and the plurality of initial link setup conditions, wherein a station that satisfies all of the plurality of initial link setup conditions is allowed to attempt to associate with the wirelessly enabled network component without additional delays, and wherein a station that does not satisfy all of the plurality of initial link setup conditions postpones attempting to associate with the wireless enabled network component until a time specified in a last received differentiated fast initial link setup (FILS) time field elapses.

12. The network component of claim 11, wherein the station types comprise a first station type and a second station type, wherein stations that belong to the first station type are instructed to associate immediately and stations that belong to the second station type are instructed to postpone their association by a time duration specified in the plurality of initial link setup conditions.

13. The network component of claim 11, wherein the instructions to broadcast the station types and the plurality of initial link setup conditions comprise instructions to broadcast a differentiated initial link setup element, wherein the differentiated initial link setup element comprises an element identifier field, a length field, and initial link setup category information field, and an initial link setup time field.

14. The network component of claim 13, wherein the initial link setup category information field comprises an initial link setup category type bitmap field, an initial link setup user priority, a media access control (MAC) address filter, and a vendor specific category.

15. The network component of claim 11, wherein the plurality of initial link setup conditions comprise a plurality of station type priorities and a plurality of association postponement times, wherein each of the plurality of association postponement times is associated with a corresponding one of the plurality of station type priorities.

16. The network component of claim 11, wherein the plurality of initial link setup conditions limit a number of stations that may attempt to associate with the wirelessly enabled network component simultaneously.

17. The network component of claim 11, wherein the plurality of initial link setup conditions specify that a station that is not authorized to attempt to associate with the wirelessly enabled network component immediately is to go into a sleep mode until an expiration of a specified time frame.

18. The network component of claim 11, wherein the plurality of initial link setup conditions specify that a station that is not authorized to attempt to associate with the wirelessly enabled network component is put in sleep mode for a minimum wait duration assigned for a station type for which the at least one station belongs.

19. The network component of claim 11, wherein the plurality of initial link setup conditions specify that a station that is not authorized to attempt to associate with the wirelessly enabled network component is put in sleep mode for a random time selected randomly from a backoff time window associated with a station type for which the at least one station belongs.

20. The network component of claim 11, wherein higher priority stations are authorized to associate sooner than are lower priority stations.

21. A method in a wireless communication device for associating with a wireless access point (AP), the method comprising:
receiving a plurality of initial link setup (ILS) conditions from the AP; and beginning associating with the AP in a time interval specified in the plurality of ILS conditions, wherein the beginning associating with the AP occurs without additional delays if the wireless communication device satisfies all of the plurality of ILS conditions, and wherein the beginning associating with the AP does not occur until a time specified in a last received differentiated fast initial link setup (FILS) time field elapses if the wireless communications device does not satisfy all of the plurality of ILS conditions.

22. The method of claim 21, further comprising entering a sleep mode for a specified minimum time duration when the wireless communication device determines that it is not authorized to immediate begin associating with the AP.

23. The method of claim 21, further comprising entering a sleep mode for a random time selected randomly from a backoff time window associated with the station type of the wireless communication device.

24. A wireless communication device configured for differentiated fast initial link setup in a wireless local area network comprising:
   a processor; and
   a computer readable storage medium storing programming for execution by the processor, the programming including instructions to:
   receive a plurality of initial link setup (ILS) conditions from the AP; and
   begin associating with the AP in a time interval specified in the plurality of ILS conditions, wherein the beginning associating with the AP occurs without additional delays if the wireless communication device satisfies all of the plurality of ILS conditions, and wherein the beginning associating with the AP does not occur until a time specified in a last received differentiated fast initial link setup (FILS) time field elapses if the wireless communications device does not satisfy all of the plurality of ILS conditions.

25. The wireless communication device of claim 24, wherein the programming further comprises instructions to enter a sleep mode for a specified minimum time duration when the wireless communication device determines that it is not authorized to immediate begin associating with the AP.

26. The wireless communication device of claim 24, wherein the programming further comprises instructions to enter a sleep mode for a random time selected randomly from a backoff time window associated with the station type of the wireless communication device.

* * * * *